PARITY CHECK CIRCUIT

Filed June 30, 1961 3 Sheets-Sheet 1

INVENTORS
FRED GERRAND
PAUL E. KAUFFMAN

BY Joseph J. Connerton
ATTORNEY

Sept. 15, 1964 F. GERRAND ET AL 3,149,307

PARITY CHECK CIRCUIT

Filed June 30, 1961 3 Sheets-Sheet 2

Sept. 15, 1964 F. GERRAND ETAL 3,149,307

PARITY CHECK CIRCUIT

Filed June 30, 1961 3 Sheets-Sheet 3

United States Patent Office 3,149,307 Patented Sept. 15, 1964

3,149,307
PARITY CHECK CIRCUIT

Fred Gerrand, Red Hook, and Paul E. Kauffman, Hurley, N.Y., assignors to International Business Machines Corporation, New York, N.Y., a corporation of New York Filed June 30, 1961, Ser. No. 121,181
5 Claims. (Cl. 340—146.1)

This invention relates to circuitry for performing logical functions in electronic digital computers, and more particularly is concerned with a logical arrangement to simplify the checking of parity in such computers.

Because of the complexity and speed of operation of large scale digital computing apparatus and data processing systems, extensive and elaborate checking circuitry are frequently incorporated to detect and indicate malfunctions. One area where such errors might occur during data manipulation within an electronic computer, for example, occurs during a transfer operation wherein information is transferred within the computer apparatus. By checking the information immediately after each transfer, certain errors resulting from the faulty transfer of information can be detected and the information caused to be retransmitted correctly.

One of the most common types of checking circuits used in such transfer functions is the parity check circuit whereby a number held in a register is examined to determine whether the aggregate of its digits having a selected value is odd or even, and whether the result agrees with the correct parity of the number, as previously determined. One example of a parity code generator and error detecting circuit is described in U.S. Patent No. 2,884,625, entitled "Code Generator," to B. W. Kippenhan and assigned to the assignee of the instant invention. However, a considerable amount of equipment is generally required to provide such parity indication, the amount of equipment generally varying in proportion to the word length utilized by the computer. This extra equipment introduces added complexity into the system as well as detracting from the speed at which computations can be carried out or data processed.

In accordance with the present invention, there is provided an improved parity check system for checking the transfer of information within a computer utilizing existing equipment. More specifically, a register into which information has been transferred is interconnected to permit a series of parallel half-add operations between fixed bytes in the register, each half-add operation reducing the word length being checked by half, and comparing the parity of the half-add sum with the parity of the number stored in the register. Utilizing the principle that the parity of the half-add sum of two halves of a register is equal to the parity of the entire register, each half-add operation reduces the information to be parity checked by 50%. Thus in a register having a number of positions equal to a multiple of two, the information to be checked could be ultimately reduced to a single bistable device, limited only by the amount of time permitted. The ultimate reduction afforded can represent a compromise between equipment and time limitations of the system, since each half-add operation normally requires a machine cycle. The original contents of the register may be restored, if necessary, by reversing the sequence of half-adds.

Accordingly, a primary object of the invention is to provide an improved parity check system.

Another object of the present invention is to provide an improved parity check circuit wherein a saving of components is effected.

A more specific object of the present invention is to provide an improved logical organization for affording a substantial reduction in the number of binary digits in a register to be checked with a corresponding reduction in checking circuitry.

A further object of the present invention is to provide an improved checking circuit utilizing a register wherein fixed register bytes are interconnected in logical half-add relationship to thus permit a substantial reduction in decoding circuitry.

Other objects of the invention will be pointed out in the following description and claims and illustrated in the accompanying drawings, which disclose, by way of example, the principle of the invention and the best mode, which has been contemplated, of applying that principle.

Throughout the following description and in the accompanying drawings there are certain conventions employed which are familiar to certain of those skilled in the art. Additional information concerning these conventions is as follows:

In the logical or block diagrams of the drawings a conventional arrowhead is employed to indicate: (1) a circuit connection, (2) energization with pulse signals and (3) the direction of pulse travel which is also the direction of control. A diamond-shaped arrowhead indicates: (1) a circuit connection, and (2) energization with a D.C. level. The input and output lines of the block symbols are connected to the most convenient side of the block for ease of illustration. A line entering a corner of a block symbol and emerging from the adjacent corner of a block symbol indicates that the pulses or D.C. levels are applied to the input of the circuit represented by the block and are simultaneously applied to additional circuits indicated by the line extension. Where a plurality of gates are shown connected to the input of certain register stages, such gates are independently controlled and an output of either of these gates will provide an input to the associated flip-flop. In the description, a general arrangement of a preferred embodiment of this invention will be described with respect to the manner to which the various circuits, components and apparatus are interconnected as well as the general overall operation which is performed by these components and apparatus. The description of the general arrangements will be followed by separate and detailed descriptions of the various components and apparatus which so require it.

Figure 1:
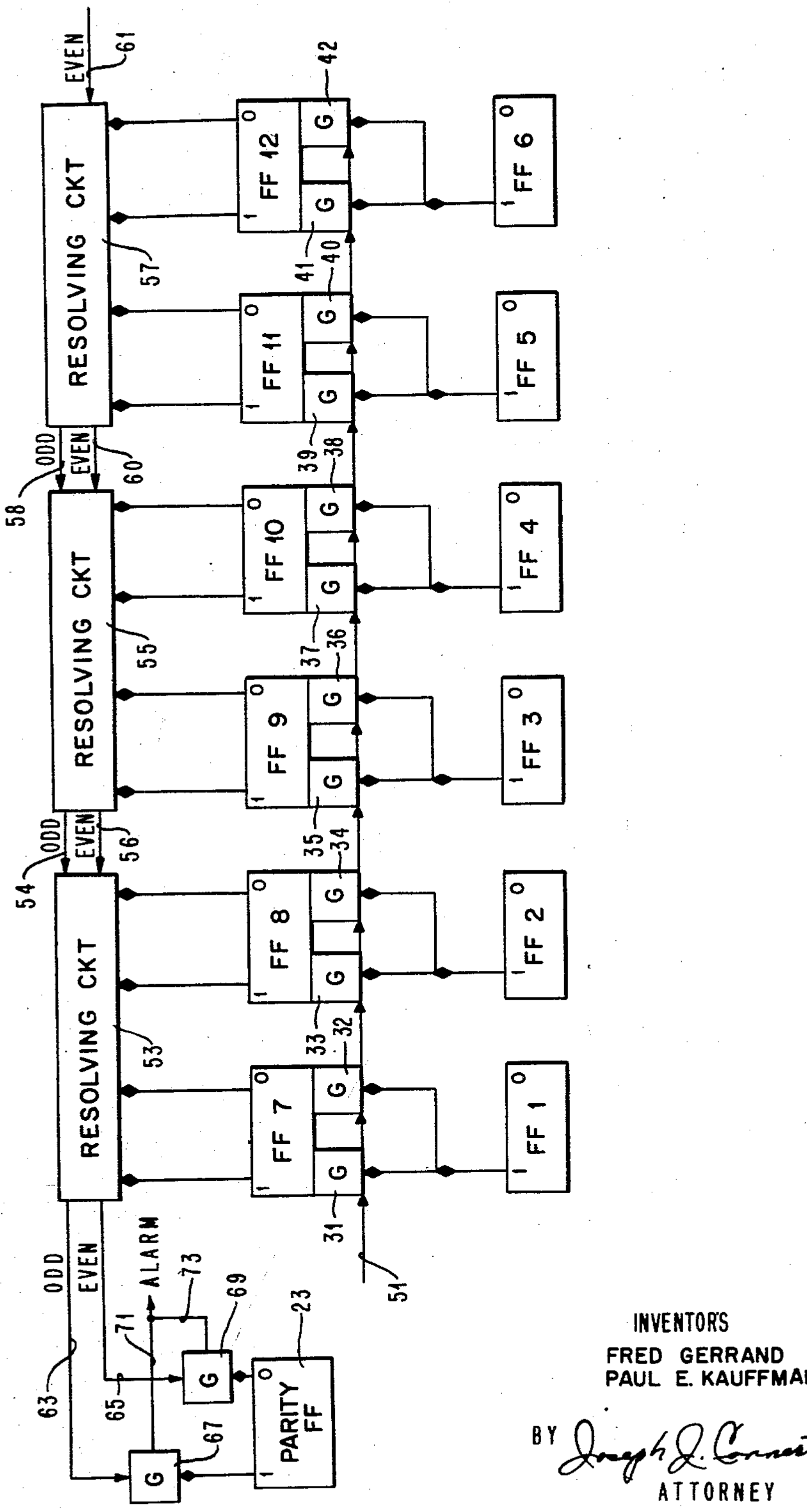
FIG. 1 is a logical block diagram illustrating a simplified embodiment of the subject invention.

Referring now to the drawings and more particularly to FIG. 1 thereof, numerals 1 through 12 refer to individual stages or orders of a register for the storage of binary digits. By way of example, each stage is deemed to comprise a bistable element or flip-flop. The number whose parity is to be determined is stored in a twelve position register logically interconnected or folded back in the manner indicated. Flip-flop 23, labeled PARITY FF, holds the correct parity of the number as previously determined. The binary one output from flip-flops 1–6 conditions gates 31–42 which are associated with the one and zero inputs to flip-flops 7–12, respectively, while the binary zero output of flip-flops 1–6 is not utilized. Thus, effectively, the register is interconnected as a "half-adder" in which flip-flops 1–6 may be considered to comprise the addend register, flip-flops 7–12 the augend or sum register. As is well-known in the art, a half-adder is a device which will accept two signals representing the augend and addend digits and produce output signals representing the sum and carry in accordance with the boolean truth table indicated below, the "half" term indicating that it is still necessary to add the carry signals from the lower order stages to obtain the correct sum digit in the number representing the sum of the augend and addend.

| | | | | |
|---|---|---|---|---|
| Augend Digit | 0 | 1 | 0 | 1 |
| Addend Digit | 0 | 0 | 1 | 1 |
| Sum Digit | 0 | 1 | 1 | 0 |
| Carry | 0 | 0 | 0 | 1 |

In the instant invention, only a single half-add operation to obtain the sum digit indicated in the truth table is employed, the second half-add operation involving the carries from the lower order stages is not utilized. The addend register is interconnected to the augend register in such a manner that when the gates associated with the augend register are pulsed, those augend stages conditioned by the corresponding addend stages are "complemented"; i.e., the associated flip-flop is changed from one to zero or vice-versa.

Although they have not been shown for the sake of clarity, it will be understood that each of the register flip-flops 1–12 has a pair of inputs to condition it which may be of an entirely conventional nature. The prior art is replete with schemes for providing a parity check of the contents of a register, but no known prior art operates by reducing the word length to be checked in the manner taught by the instant invention. To determine the parity of a number, a scale of two counter adapted to respond in one by one fashion to the digits of the number is frequently used. A disadvantage of this scheme is that it detracts appreciably from the speed at which computations or data processing can be carried out in many present day computing machines. Various ripple-type circuits have been proposed for checking parity, such as, for example, an arrangement of four pulse gates per register stage. Another scheme utilized in the prior arti s a series of parity resolving circuits, each such circuit resolving the parity of a pair of flip-flops. Such a scheme is disclosed in copending application Serial Number 784,281, now Patent No. 3,001,073 entitled "Parity Check Switching Circuit," filed by Joseph J. Moyer on December 31, 1958, assigned to the assignee of the instant application, and used to illustrate the operation of the instant invention. However, all the checking schemes in the prior are require considerable amounts of relatively complex checking equipment embodying a considerable amount of components. By utilizing the half-add technique herein described, each half-add operation reduces the required checking equipment by 50%. For example, in the above designated copending application Serial Number 784,281, a twelve stage register would require six resolving circuits, while the simplest embodiment of the instant invention illustrated in FIG. 1 only utilizes three such circuits for the same parity check. In the ensuing description the manner in which checking equipment is even further reduced will be clarified.

Returning now to FIG. 1, to initiate the half-add operation, line 51 is pulsed from any convenient source and the half-add sum of the addend and augend is deposited in register stages 7–12, while parity flip-flop 23 remains unchanged. Since a resolving circuit of the type described in copending application Serial Number 784,281 is required for each pair of flip-flops, three such resolving circuits designated as 53, 55 and 57 are provided to check the sum register. As illustrated, each resolving circuit has as inputs the one and zero outputs of its associated pair of flip-flops. For example, the one and zero outputs of flip-flops 7 and 8 comprise the inputs to resolving circuit 53. In addition, resolving circuits 53 and 55 have pulse inputs 54, 56 and 58, 60 designated odd and even from resolving circuits 55 and 57, respectively, while resolving circuit 57 has a single input 61 designated even. As shown, these odd and even pulse inputs are derived from the resolving circuits from the next lower order pair of register stages, excepting of course, that the even input 61 for resolving circuit 57 which is not preceded by any other resolving circuit. Rather, input 61 receives a pulse from any convenient source when it is desired to initiate parity checking.

Emanating from resolving circuit 53 are odd and even output lines 63 and 65 which sense a pair of gates 67 and 69. Gates 67 and 69 in turn are conditioned by the respective one and zero output of the parity flip-flop 23 to pass a parity error alarm pulse on one of two lines 71 and 73 if it turns out that the parity of the register does not agree with the parity stored in the parity flip-flop. Using odd parity, for example, an odd output from resolving circuit 53 coupled with a parity indication of one would indicate an error. Conversely, an even output from resolving circuit 53 coupled with a parity indication of zero would also produce an alarm.

The parity resolving circuit operates in the following manner. To determine the parity of the number stored in the augend register, line 61 is pulsed to provide the effect of an even parity indication on resolving circuit 57. That is to say, it is as if an odd combination of 1's could not exist in the preceding register stages, which is indeed the case since there are no preceding stages. In response to the pulse on line 61, circuit 57 resolves the parity of the flip-flops 11 and 12 by passing the pulse to a selected one of the odd and even output lines 58 and 60. For example, if one and only one of the flip-flops 11, 12 were standing in a one state, the pulse would be transmitted to the resolving circuit 55 by way of the odd output line 58. Conversely, if neither or both of the flip-flops held one, the pulse would be transmitted by way of the even line 60. Upon receipt of the pulse, the next resolving circuit 55 makes a parity determination on the basis of the parity which the pulse represents as well as on the basis of the digits stored in the flip-flops 9 and 10. For example, if the pulse is passed by way of the odd line 58, and flip-flops 9 and 10 both hold one, the pulse would be transmitted to resolving circuit 53 by way of the odd line 54. Conversely, if one of the flip-flops 9, 10 held a zero, the pulse would be passed on by way of the even line 56. Thus, in effect, parity indication of the register stages 7–12 ripple through the resolving circuits from right to left in the drawing, the resulting parity being indicated in terms of a pulse on one of the lines 63 and 65. As aforementioned, disagreement between the result determined in this way and the parity stored in the flip-flop 23 causes an alarm pulse to be passed to one of the lines 71 and 73.

Figure 2:
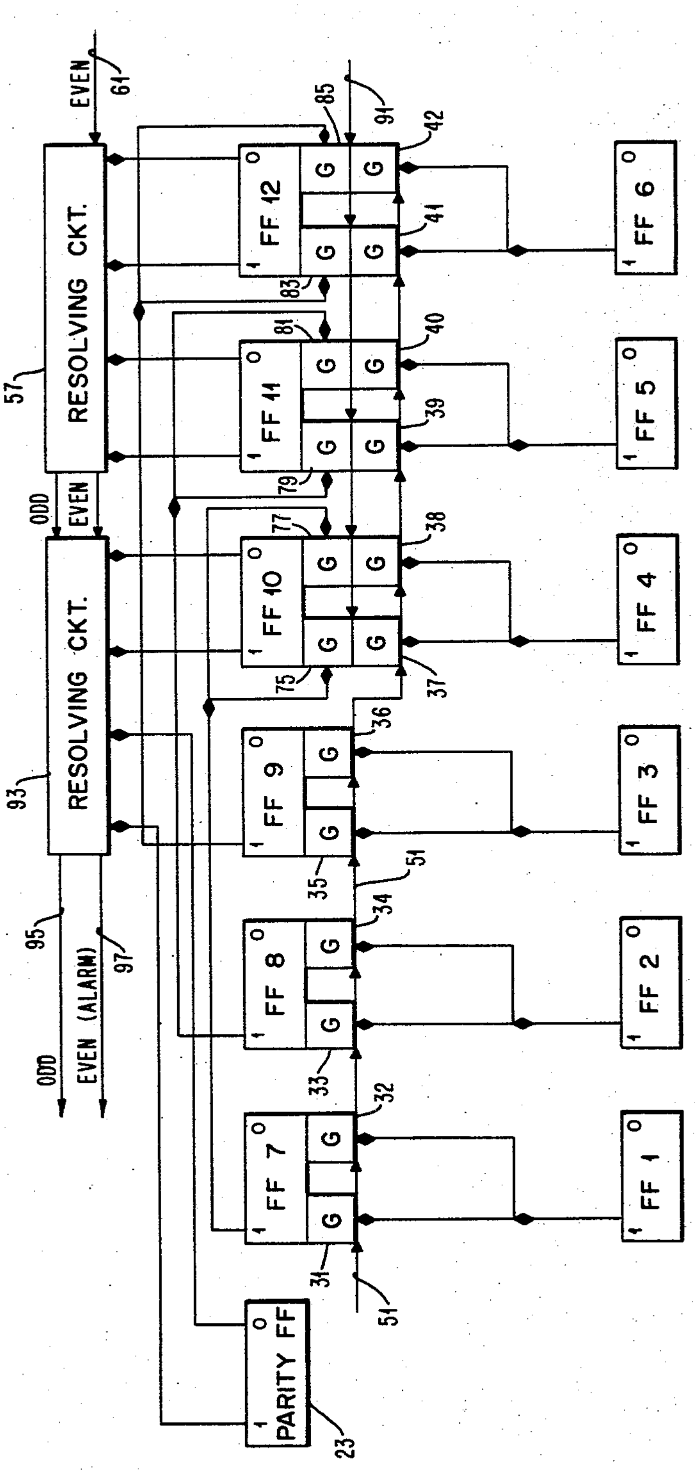
FIG. 2 is a logical block diagram of another embodiment of the subject invention illustrating the interconnection of a series of fixed bytes within a register.

With reference now to FIG. 2 wherein like components are identified by corresponding subscripts, there is illustrated an extension of the arrangement of FIG. 1 utilizing the logical arrangement for two half-add operations. The initial addend and augend are half added and the half-add sum stored in flip-flops 7–12 in the manner heretofore described relative to FIG. 1. Now the six bit half sum register comprising flip-flops 7–12 is logically divided into two 3 bit bytes, the binary one output of flip-flops 7, 8 and 9 being connected to condition gate circuits 75, 77, 79, 81 and 83, 85, respectively, which in turn are connected to flip-flops 10, 11 and 12. The second half-add operation is then initiated by a pulse applied to line 91, whereupon the half-add sum is generated in the manner heretofore described in flip-flops 10, 11 and 12. The half-add sum is then decoded in the manner heretofore described by resolving circuits 57 and 93; resolving circuit 57 determining the parity of flip-flops 11 and 12, resolving circuit 93 determining the parity of flip-flop 10 and parity flip-flop 23. Utilizing odd parity, an even output on line 95 will indicate an error: conversely, utilizing even parity, an odd output on line 97 will indicate an error. Thus by using two half-add operations, the parity resolving equipment is substantially reduced, since resolving circuit 93 also resolves the parity flip-flop eliminating the need for gate circuits 67 and 69 in the FIG. 1 embodiment. The only operational difference between the embodiment of FIG. 2 relative to FIG. 1 is that a second machine cycle is employed. The dual gate circuit entries to flip-flops 10, 11 and 12 are individually controlled, an output from either gate providing a corresponding entry to the flip-flop. In flip-flop 10, for example, the first half-add operation utilizes gate circuits 37 and 38; the second half-add operation utilizes gate circuits 75 and 77. From the above description the manner in which the parity checking equipment is reduced by utilizing half-add operations in the manner heretofore described can be readily appreciated. The novel flip-flop gating circuitry employed and described relative to FIG. 3 makes this arrangement even more attractive. From the arrangement above described, the parity checking equipment has been reduced approximately 75% by means of two half-add cycles. While a twelve position register has been utilized to illustrate the subject invention, it will be apparent that the principle of the instant invention is equally applicable in registers or more or fewer stages. Utilizing a sixteen stage register, three half-add operations reduces the equipment to be checked to two flip-flops, while a fourth cycle would reduce the equipment to be checked to a single flip-flop. To restore the contents of the register to its original value, the half-add lines 51 and 91 would be pulsed in their reverse order, i.e., in the FIG. 2 embodiment, lines 91 and 51 would be pulsed in that order. In the FIG. 1 embodiment, it would merely be necessary to pulse line 51.

Figure 3:
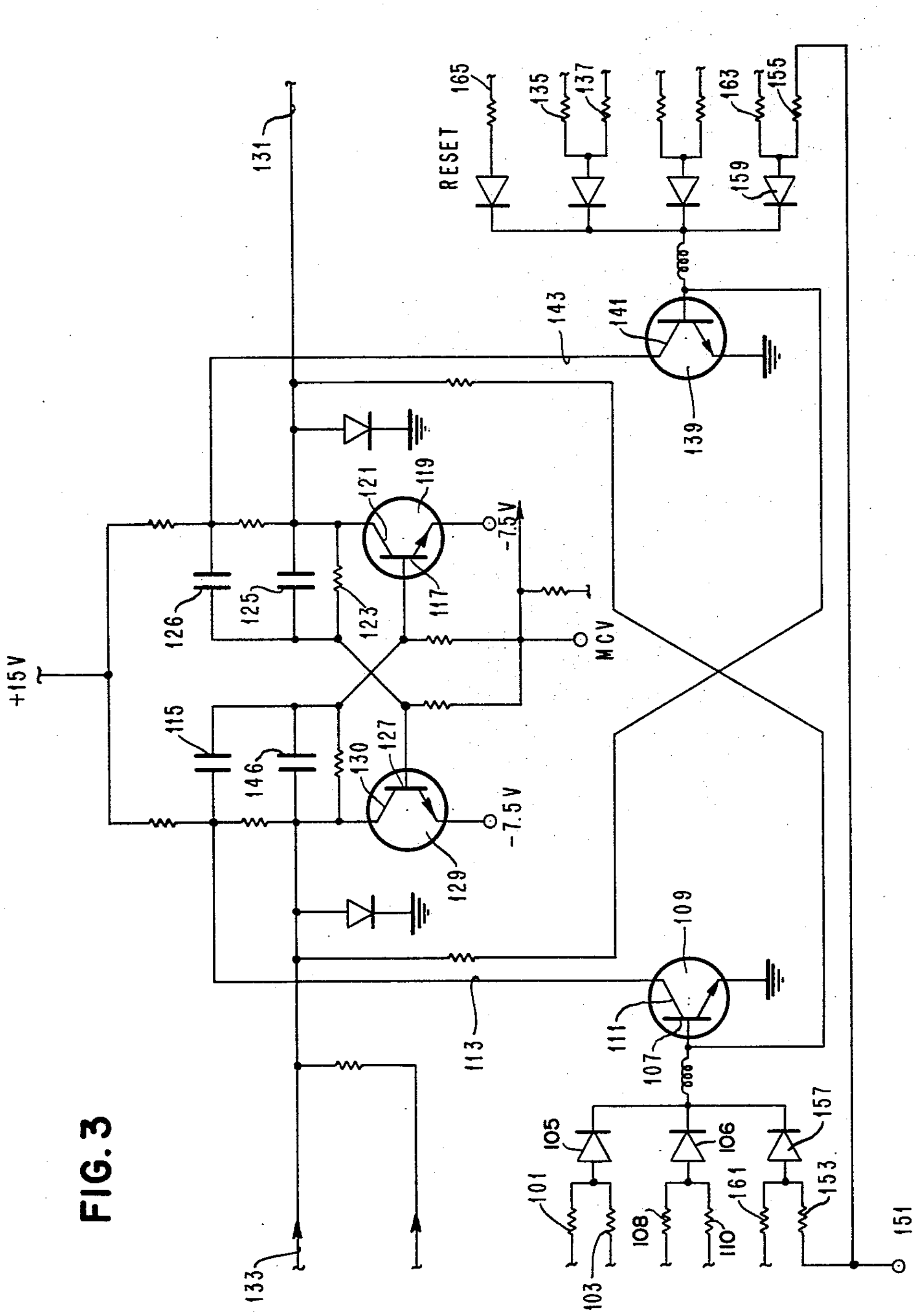
FIG. 3 illustrates in schematic form a gated input flip-flop of the type illustrated in block form in FIGS. 1 and 2.

Referring now to FIG. 3, there is illustrated a schematic diagram of the gated flip-flop shown in block form in FIGS. 1 and 2. In the logic herein employed, the gate is conditioned by a positive D.C. level to pass a positive pulse to the appropriate input level. Passive gates consisting of a pair of resistors, such as 101, 103, are employed, one input being connected to a D.C. level, positive or negative, the other being pulsed. If resistor 101 is connected to a positive or conditioning level, a positive pulse applied to resistor 103 will pass via diode 105 to the base 107 of transistor 109; if resistor 101 is connected to a negative level, the pulse will not pass. Diode 106 in combination with resistors 108 and 110 function as another input to transistor 109. Assuming the gate is appropriately conditioned, transistor 109, normally off, is saturated for the duration of the pulse and the resulting negative shift on collector 111 is applied via line 113 and capacitor 115 to the base 117 of transistor 119 to turn transistor 119 off. The positive output at collector 121 is RC coupled via resistor 123 and capacitors 125, 126 to the base 127 of transistor 129 to turn on and maintain transistor 129 on. In this state, output terminal 131, corresponding to the one output of the flip-flop, is positive, output terminal 133, corresponding to the zero output, is negative. In a typical application of the invention, the terms positive and negative levels are used to designate the relative rather than actual value of the output signals, and in the preferred embodiment herein described, ground and −6 volts comprise the positive and negative levels respectively.

To turn the flip-flop off, assuming resistor 135 is appropriately conditioned, a pulse applied to resistor 137 will turn transistor 139 on, and the resulting negative shift at conductor 141 applied via line 143 and capacitor 126 to the base 127 will turn transistor 129 off. The resulting positive shift at collector 130 is RC coupled via resistor 145 and capacitors 115, 146 to the base 117, turning transistor 119 on. The reversal of state of transistors 119 and 129 reverses the level of the output signals.

To provide a complementing operation, which is essentially the operation utilized in the instant invention, a pulse is applied to input terminal 151 and thence via resistors 153 and 155 and diodes 157 and 159 to turn transistors 109 and 139 on, it being assumed that resistors 161 and 163, respectively, are appropriately conditioned. Depending on which of transistors 119 and 129 is on, the resulting negative signal from collectors 111 and 141 will cause transistor 119 or 129, respectively, to be turned off, which in turn will turn and maintain the other transistor on in the manner above-described. The preferred embodiment of the flip-flop shown in FIG. 3 utilizes three input gates on the one and zero input, and the zero input includes a reset line 165. It will be obvious that the number of gated inputs can be increased by merely adding two resistors and a diode.

While the invention has been particularly shown and described with reference to preferred embodiments thereof, it will be understood by those skilled in the art that various changes in form and details may be made therein without departing from the spirit and scope of the invention.

What is claimed is:

1. A logical circuit adapted to provide a simplified parity indication of the contents of a register comprising in combination a register of bistable devices, means interconnecting the stages of said register in a half-add logical configuration, means responsive to a sampling signal to perform said half-add operation and to store the half-add sum of the interconnected register stages into selected stages of said register and means for checking the parity of the half-add sum of said selected stages with the parity of the original contents of said register.

2. A logical circuit adapted to simplify the parity determination of the contents of a register by reducing the word length being checked comprising in combination a multi-stage register, means interconnecting the halves of said register in a logical half-add configuration, said interconnecting means connecting the input to predetermined register stages with the output from the remaining register stages, means for sampling the conditioned stages with a half-add pulse whereby the contents of said register are modified to reflect the results of said half-add operation and means for comparing the parity of the half-add sum with the original parity of the register.

3. A system adapted to simplify the parity determination of the contents of a register by performing successive half-add operations thereon comprising in combination a register, said register comprising a plurality of stages, each stage including a bistable device, circuit means interconnecting the output of first predetermined stages to the inputs of second predetermined stages of said register in half-add configuration whereby said second predetermined stages are conditioned when corresponding stages of said first predetermined stages are in one of their bistable conditions, means for sampling the inputs of said second predetermined stages with a half-add signal whereby the half-add sum of the first and second register stages are in said second predetermined stages and means for decoding said second predetermined stages to obtain a parity indication thereof.

4. A parity checking circuit adapted to check the contents of a register following a transfer operation comprising a register, parity indicating means, means interconnecting the stages of said register in a plurality of half-add configurations, means for performing said half-add operations in response to appropriate pulse signals whereby the ultimate half-add sum is stored in selected stages of said register and means for comparing the parity of said half-add sum with said parity indicating means to determine if a parity error has occurred.

5. A logical circuit for simplifying the parity resolution of a binary register comprising a register of bistable devices, means interconnecting the stages of said register in a half-add configuration, means for performing said half-add operation and storing the resultant sum in predetermined stages of said register, each such half-add operation reducing the register length to be checked by half and means for resolving the parity of the resulting sum to determine the parity of the contents of said register.

No references cited.